(12) United States Patent
Fuerst et al.

(10) Patent No.: US 10,112,564 B2
(45) Date of Patent: Oct. 30, 2018

(54) CRASHBOX

(71) Applicant: GM GLOBAL TECHNOLOGY OPERATIONS LLC, Detroit, MI (US)

(72) Inventors: Fabian Fuerst, Ruesselsheim (DE); Stefan Holderried, Ruesselsheim (DE); Tommy Hechtel, Ruesselsheim (DE); Theobald Hock, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 17 days.

(21) Appl. No.: 15/413,099

(22) Filed: Jan. 23, 2017

(65) Prior Publication Data

US 2017/0210319 A1    Jul. 27, 2017

(30) Foreign Application Priority Data

Jan. 21, 2016   (DE) .................. 10 2016 000 599

(51) Int. Cl.
| | |
|---|---|
| *B60R 19/18* | (2006.01) |
| *B60R 19/34* | (2006.01) |
| *B60R 19/02* | (2006.01) |
| *F16F 7/12* | (2006.01) |
| *B60R 19/03* | (2006.01) |

(52) U.S. Cl.
CPC ............ *B60R 19/34* (2013.01); *B60R 19/023* (2013.01); *F16F 7/12* (2013.01); *B60R 19/03* (2013.01)

(58) Field of Classification Search
CPC ....... B60R 19/03; B60R 19/023; B60R 19/34; F16F 7/12
USPC ........................................ 296/133
See application file for complete search history.

(56) References Cited

U.S. PATENT DOCUMENTS

| | | | |
|---|---|---|---|
| 3,997,207 A | 12/1976 | Norlin | |
| 5,772,267 A * | 6/1998 | Heim | B60R 19/34 293/132 |
| 6,270,131 B1 * | 8/2001 | Martinez | B60R 19/34 188/371 |
| 6,299,227 B1 * | 10/2001 | Kroning | B60R 19/26 293/132 |
| 6,672,438 B2 | 1/2004 | Beck | |
| 8,469,417 B2 * | 6/2013 | Di Modugno | B60R 19/34 293/133 |
| 8,590,952 B2 * | 11/2013 | Jeong | F16F 7/121 293/132 |
| 9,604,586 B2 * | 3/2017 | Nickel | B60R 19/18 |

(Continued)

FOREIGN PATENT DOCUMENTS

| | | |
|---|---|---|
| DE | 19522575 A1 | 1/1996 |
| DE | 19732064 A1 | 2/1999 |

(Continued)

OTHER PUBLICATIONS

German Patent Office, German Search Report for German Application No. 102016000599.8, dated Nov. 23, 2016.

(Continued)

*Primary Examiner* — Pinel E Romain
(74) *Attorney, Agent, or Firm* — Lorenz & Kopf, LLP

(57) ABSTRACT

A crash box for a vehicle includes a body-side end face, a bumper-side end face and a plurality of supporting walls, which run in different planes extending in a longitudinal direction of the crash box between the end faces. At least one of the end faces is designed as a vault.

14 Claims, 3 Drawing Sheets

(56) References Cited

U.S. PATENT DOCUMENTS

| | | | |
|---|---|---|---|
| 9,725,057 B2 | 8/2017 | Lee et al. | |
| 2014/0367984 A1* | 12/2014 | Blumel | B60R 19/34 |
| | | | 293/132 |
| 2015/0321631 A1* | 11/2015 | Hahn | B60R 19/34 |
| | | | 293/122 |
| 2016/0001722 A1* | 1/2016 | Nickel | B60R 19/18 |
| | | | 293/120 |
| 2016/0144815 A1* | 5/2016 | Harris | B60R 19/34 |
| | | | 293/142 |
| 2017/0157863 A1* | 6/2017 | Nickel | B29C 69/02 |
| 2017/0361794 A1* | 12/2017 | Holderried | B60R 19/03 |

FOREIGN PATENT DOCUMENTS

| | | |
|---|---|---|
| DE | 19943621 A1 | 4/2001 |
| DE | 19943622 A1 | 4/2001 |
| DE | 10115568 A1 | 10/2002 |
| DE | 102009035777 A1 | 2/2011 |
| DE | 102013109434 A1 | 4/2014 |
| EP | 2335983 A2 | 6/2011 |

OTHER PUBLICATIONS

Great Britain Patent Office, Great Britain Search Report for Great Britain Application No. GB1700536.4, dated Jun. 30, 2017.

\* cited by examiner

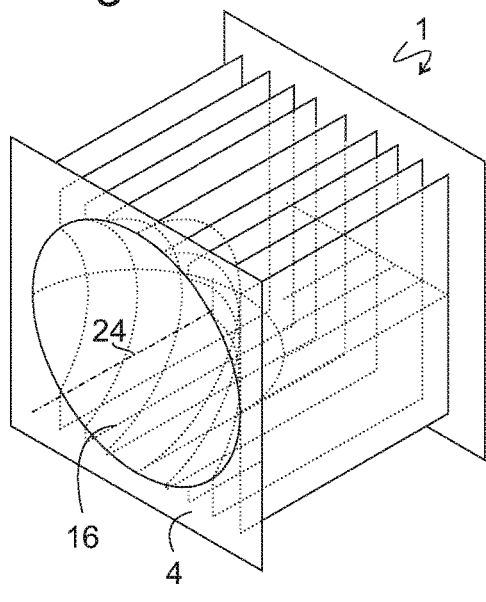
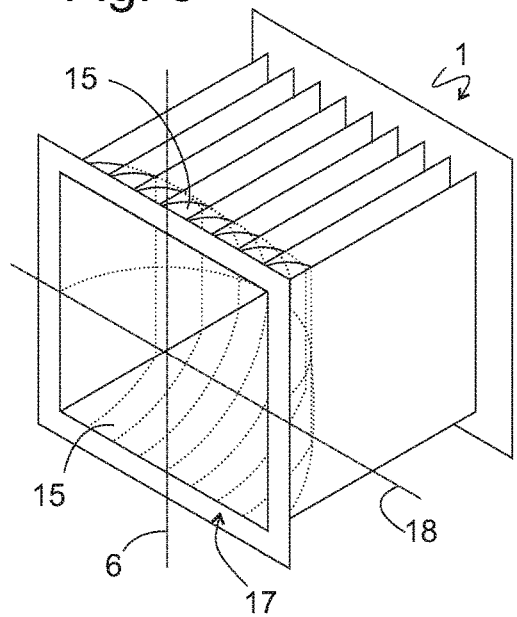
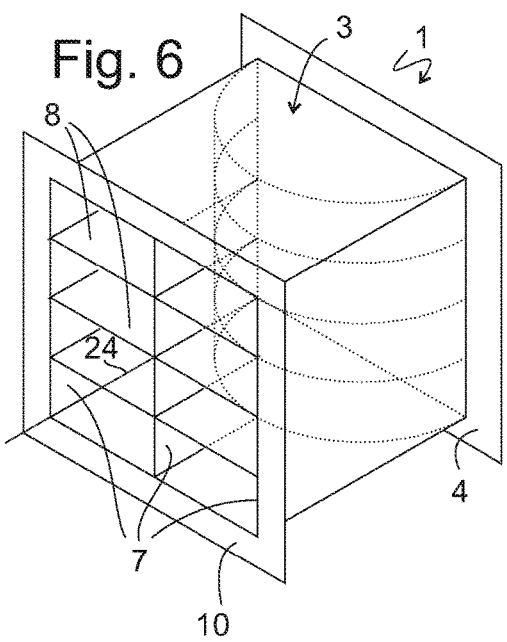
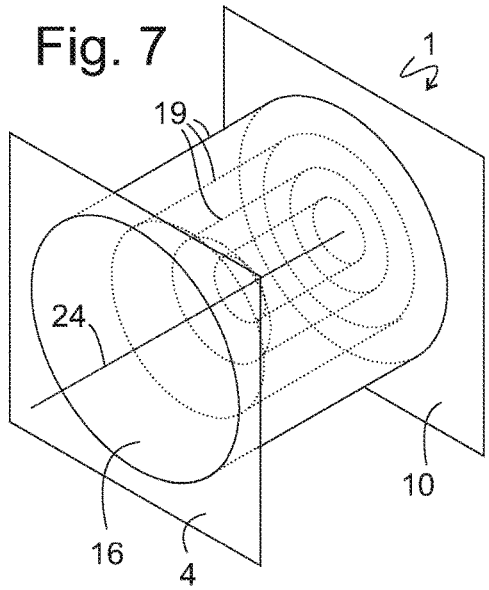

CRASHBOX

CROSS-REFERENCE TO RELATED APPLICATION

This application claims priority to German Patent Application No. 102016000599.8, filed Jan. 21, 2016, which is incorporated herein by reference in its entirety.

TECHNICAL FIELD

The present disclosure pertains to a crash box, which is conventionally inserted between a bumper and load-bearing parts of the body in a motor vehicle, to absorb energy while deforming during a collision, and thereby protect the load-bearing parts against deformation.

BACKGROUND

DE 20 2009 017 016 U1 discloses a crash box injection molded out of a fiber-reinforced plastic, in which two hollow bodies stacked one inside the other and connecting elements extending between the hollow bodies form supporting walls, which extend in the loading direction of the crash box, between a bumper-side end face and a body-side end face of the crash box. The end faces themselves are open. Collision energy is absorbed by a deformation of the supporting walls. A supporting wall that runs exactly in the loading direction has a high deformation resistance while it remains undeformed. However, this resistance collapses quickly just as soon as the supporting wall begins to give way laterally under pressure.

For achieving a uniform energy absorption over the entire compressible length of the crash box, a stepped structure of the supporting walls of the inner hollow body is provided, in which each step can collapse separately and thereby absorb energy. However, the amount of energy that can be dissipated in this way is limited for several reasons. On the one hand, the amount of energy that can be absorbed by an individual step depends on its wall thickness, but the larger the wall thickness, the greater the distance between the steps must also be, so that they can collapse separately from each other, and the fewer steps can be accommodated in a crash box with prescribed dimensions. On the other hand, in the event of a collision, both hollow bodies ultimately are supported by way of a flange at the tip of the side member—which usually is designed as a hollow profile—on its longitudinal walls. Only one of the two hollow bodies can extend in the elongation of the longitudinal walls of the side member, and the one that does not do so cannot be so stiff as to deform the flange in the event of a collision.

Accordingly, there is a need in the art to provide a crash box that exhibits a high-energy absorption capacity in relation to its weight.

SUMMARY

In one embodiment of the present disclosure, a crash box includes a body-side end face, a bumper-side end face and a plurality of supporting walls, which run in different planes extending in a longitudinal direction of the crash box between end faces. At least one of the end faces is designed as a vault. The effectiveness of this construction is based on the one hand on the fact that a supporting wall emanating from a center of the vault has a different length than one that emanates from an edge of the vault. The shorter the supporting wall, the higher its initial resistance to deformation, but also the shorter the path over which it can be compressed before buckling, and the deformation resistance drops off sharply as a result. The varying length of the supporting walls results in an energy absorption of the crash box that is uniform over the entire deformation path, since given a deformation in which the one short support wall has already buckled, a longer one can still exhibit a high deformation resistance. A second effect that increases the energy absorption capacity of the crash box is the carrying capacity of the vault itself. Even given a slight wall thickness, the latter exhibits a high load-bearing capacity, and can be configured to initially withstand a load that causes the supporting walls to collapse, and only be weakly pressed once the energy absorption capacity and deformability of the supporting walls have been completely spent. In addition, the vault can be used to laterally deflect and introduce into the longitudinal walls the collision forces that act on supporting walls offset relative to the longitudinal walls of a cross member carrying the crash box. Because supporting walls that do not extend in the elongation of the long walls thus also contribute to the stiffness of the crash box, the volume of the crash box can be utilized efficiently.

In the simplest case in terms of production technology, the vault can be a barrel vault. Since the outer edges of such a barrel vault can be aligned flush with the walls of a side member carrying the crash box, the compression forces can be favorably transmitted over the long walls of the side member. Although a higher load-bearing capacity can be achieved with a geodetic vault than with a barrel vault, the round edge progression of the vault can here hamper the introduction of forces into the side member.

One solution that combines a high load-bearing capacity with an efficient introduction of forces into the side member involves a so-called cloister vault. The vault is preferably outwardly concave, i.e., the protective walls emanating from an apex of the vault are shorter than those emanating from the edge of the vault.

For an efficient introduction of forces into the side member, it further makes sense that the vault form the body-side end face of the crash box, i.e., the one facing the side member.

To permit a cost-effective manufacture of the crash box in a molding process, such as casting or in particular injection molding, the supporting walls should preferably border depressions that are open transverse to the longitudinal direction of the crash box.

Lateral walls of the depressions are preferably included of supporting walls that are parallel to each other. In this way, several depressions can be generated by complementary projections of an identical molding die that can be moved transverse to the longitudinal direction of the crash box.

It is further advantageous from a production standpoint for the supporting walls to encompass a primary supporting wall and secondary supporting walls protruding from opposing sides of the primary supporting wall.

The crash box can be completely or partially injection molded out of plastic. In order to achieve a high load-bearing capacity, it preferably consists at least partially of fiber-reinforced plastic. While fiber-reinforced plastic can also be sprayed, the concentration and length of the fibers are limited in a sprayable plastic. If a high concentration of long fibers is to be used for achieving a high load-bearing capacity, the crash box should at least in part be fabricated, in particular thermoformed, out of a fiber-reinforced semi-finished product, such as a so-called organo sheet.

The bumper-side end face of the crash box can be designed as a single piece with a bumper cross member. In order to guarantee an unbreakable bond between the bumper cross member and crash box even under a high load during a collision, a fiber insert can extend from the bumper cross member into one of the supporting walls.

BRIEF DESCRIPTION OF THE DRAWINGS

The present disclosure will hereinafter be described in conjunction with the following drawing figures, wherein like numerals denote like elements.

FIG. 4 is a crash box according to a second embodiment;

FIG. 5 is a crash box according to a third embodiment;

FIG. 6 is a crash box according to a fourth embodiment in a perspective view at an inclination from the front;

FIG. 7 is a variant of the second embodiment;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
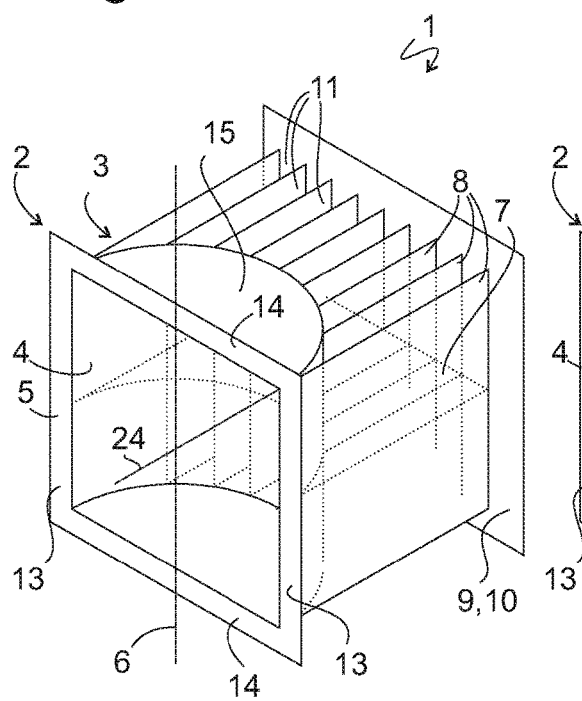
FIG. 1 is a schematic, perspective view of a crash box according to a first embodiment of the present disclosure.

FIG. 1 shows a crash box 1 according to a first embodiment of the present disclosure in a perspective view. A body-side end face 2 faces the viewer. The body-side end face 2 includes a closed wall 3, which is shaped like a vault, in particular as a barrel vault 4. The barrel vault 4 is surrounded by a flange 5 for fastening to a body side member. An axis 6 including the center of curvature of the barrel vault 3 lies in the plane of the flange 5. It could, however also run beyond the flange 5 through a side member having a tip mounting it to the crash box 1, in which case the distance between the axis 6 and plane of the flange 5 should not exceed half the radius of curvature of the vault 4.

Several supporting walls 7, 8 extend from the convex side of the barrel vault 4 facing away from the viewer in the longitudinal direction 24 of the crash box 1. The mutually parallel supporting walls 8 oriented parallel to the vault axis are in part transparently depicted for showing a supporting wall 7 concealed inside of the crash box 1, which centrally crosses and interconnects the respective supporting walls 8. The edges of the supporting walls 7, 8 facing away from the viewer are formed as a single piece with a flange 9, which includes a bumper-side end face 10 of the crash box 1.

If the crash box 1 is exposed to a load during a collision, a stress builds quickest in the shortest supporting wall 8, in the middle of the crash box 1, which forces the supporting wall 8 to laterally give way and deflect. The barrel vault 4 is first prevented from yielding by the pressure to which it is exposed by the adjacent supporting walls 8. The respectively longer supporting walls 8 to the side of the center subsequently give way, and only once the supporting walls 8 are compressed to the point where they can no longer give way is the barrel vault 3 also pressed flat.

An injection molding die with three reciprocally movable parts is required to mold the crash box 1 out of plastic, one for molding the bumper-side end face, one that can move in the longitudinal direction of the crash box 1 to mold the barrel vault 3, and two that can move transverse to the longitudinal direction 24 and exhibit projections that engage into depressions 11 between the supporting walls 6 to mold the supporting walls 5, 6.

Figure 2:
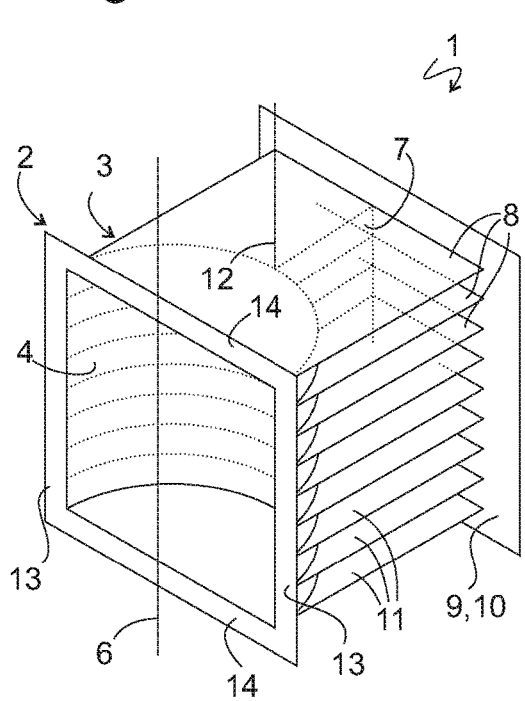
FIG. 2 is a crash box according to a variant of the first embodiment.

FIG. 2 shows a crash box 1 according to a second embodiment of the present disclosure in the same perspective as on FIG. 1. Here as well, the body-side end face 2 includes a barrel vault 4, but the mutually parallel supporting walls 8 are oriented transverse to the axis 6 of the barrel vault 3, and the supporting wall 7 that joins the parallel supporting walls 8 emanates from an apex line 12 of the barrel vault 3.

Both embodiments share in common that the load acting on the crash box 1 is predominantly diverted toward legs 13 of the flange 4 that are parallel to the axis 6 of the barrel vault 3 and vertical. The legs 14 perpendicular to the axis 8 are only exposed to a slight load due to the relatively easy deformability of the front surfaces 15 of the barrel vault.

Figure 3:
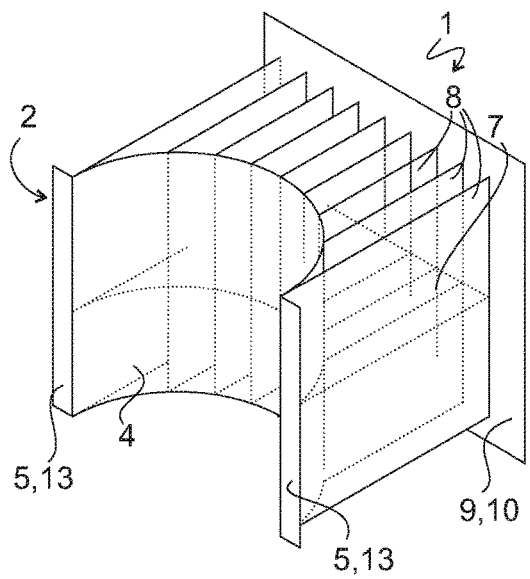
FIG. 3 is a second variant of the first embodiment.
Figure 8:
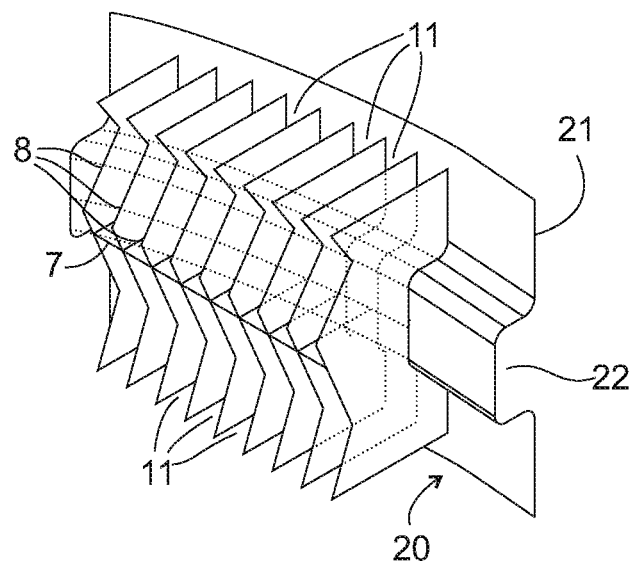
FIG. 8 is a perspective view of the front part of a crash box designed as a single piece with a bumper cross member.

As shown on FIG. 3, this can be taken as motivation to further simplify the structural design of the crash box 1 and simply omit the front surfaces 15 and legs 14. The advantage to this is that the structural design of the molding die used to injection mold the crash box 1 can be further simplified, since a part movable in the longitudinal direction 24 of the crash box is no longer required for molding the vault 4.

A uniform distribution of collision forces on the periphery of the flange 4 can be achieved by replacing the barrel vault 4 with a geodetic vault 16 having a spherical curvature, as illustrated on FIG. 4. Here as well, the center of curvature can lie in the plane of the flange 4, or in the side member adjoining the flange 4 spaced apart from this plane by up to half the radius of curvature.

Another way to achieve a more uniform distribution of collision forces over the entire periphery of the flange 4 involves tilting the front surfaces 15 of the barrel vault 4 shown on FIG. 1 against the vault axis 6. The supporting walls 7 or 8 parallel to the vault axis 6 can then extend up to the front surfaces 15 and reinforce the latter.

Additional interim solutions for the shape of the arch 3 are also possible, for example, the front surfaces 15 can themselves be curved instead of tilted, thereby resulting in a cloister vault 17, as shown on FIG. 5.

The two front surfaces 15 can have a shared axis of curvature 18 or, deviating from the illustration on FIG. 5, two different axes of curvature 6. If the axes of curvature differ, they can also be oriented relative to each other at a non-vanishing angle, so that the vaults with a trapezoidal or generally irregular square base area can be obtained.

Additional vault shapes known from architecture applications are also possible.

FIG. 6 shows a crash box 1 according to another embodiment of the present disclosure in a perspective view from the side of the bumper. While the figure shows a barrel vault 3 inside of the crash box 1 corresponding to those on FIGS. 1 and 2, other vault shapes are also possible. One difference from the previously examined embodiments is that the supporting walls 7, 8 form a box open toward the bumper-side end face 10, and a tool part for molding the supporting walls 7, 8 that stiffen the interior of the box must be demolded via the bumper-side end face 10.

If the bumper-side end face 10 is open for demolding a tool part, the supporting walls 7, 8 that cross each other and continuously extend between opposing sides of the crash box 1 can be replaced by supporting walls 19 stacked one inside the other, as shown on FIG. 7. Supporting the latter by the vault, again depicted as a geodetic vault 16, makes it unnecessary to join the supporting walls 19 with each other by means of supporting walls extending in the longitudinal direction 24 of the crash box 1, so that the supporting walls 19 are independent of each other in the event of a collision, and the collapse of a first supporting wall 19 does not have a domino effect on the others. The supporting walls 19 curved around an axis oriented in the longitudinal direction 24 of the crash box 1 are highly loadable given a slight wall thickness. Since they can be tightly stacked one inside the other, they can be present in a large number, but with a slight wall thickness, so that a high-energy absorption can be achieved at an especially low weight.

In particular, in the embodiments on FIGS. 1 to 4, the bumper-side end face 10 designed as a closed wall can itself be configured as an integral component of a bumper cross member 20, as illustrated in a partial view on FIG. 6. The bumper cross member 20 is here designed as a one-walled plate 1, which is reinforced by a horizontal groove 22 recessed in its center. At least one additional molding die part is required to form the groove 22; however, since the groove 22 is here open toward the side facing away from the crash box 1, the depressions 11 between the supporting walls 8 remain free of undercuts, so that four molding die parts are sufficient to mold the crash box 1, including the bumper cross member 21.

Basically, any other cross sectional shapes desired are also possible for the bumper cross member 21. If desired, the bumper cross member 21 can also be designed as a hollow profile from an extruded profile, to which the crash boxes are molded, in particular sprayed, in a second processing step, or it can be put together into a hollow profile using several one-walled elements.

The crash box 1 in its entirety can be injection molded out of plastic, in particular fiber-reinforced plastic. To achieve the highest load-bearing capacity at a slight wall thickness, it is preferred that at least individual walls of the crash box 1 be fabricated out of a fiber-reinforced semi-finished product, such as an organo sheet. This can be done by taking the semi-finished product, possibly made pliable by heating, and placing it into an injection molding die with several reciprocally movable parts as explained above, and spraying on thermoplastic material to enhance it and yield a finished crash box 1.

Figure 9:
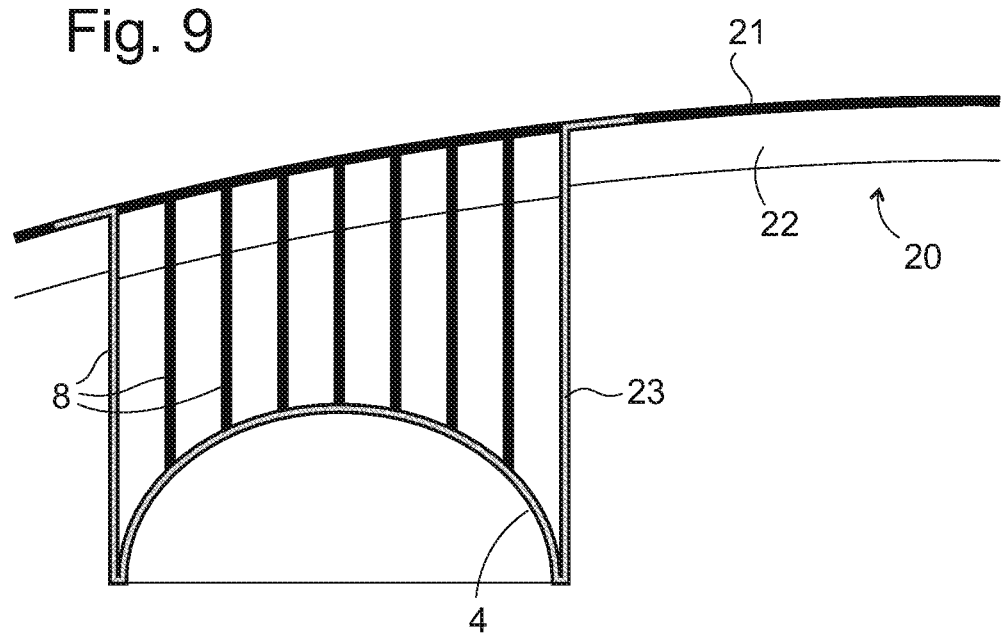
FIG. 9 is a horizontal section through a crash box as a single piece with the bumper cross member.

FIG. 9 shows an exemplary section through a crash box 1 obtained with the use of fiber-reinforced semi-finished product. The crash box 1 is of the type depicted on FIG. 1, with a barrel vault 4. A blank included of fiber-reinforced semi-finished material was placed in the injection mold in such a way that it extends from the barrel vault 4 over the two outermost supporting walls 8 parallel to the axis 6 until into the bumper cross member 12. The thermoplastic matrix of the semi-finished product is chemically identical to the sprayed-on thermoplastic material, and intimately fused with the latter, so that both can no longer be distinguished from each other in the finished product, and only a fiber insert 23 of the semi-finished product remains discernible.

The extent to which the fiber-reinforced semi-finished product can be deformed to adapt to the shape of the crash box 1 in the molding die depends on the type of fiber insert 23. If the latter is a loose non-woven, a spherical deformation is also possible, in particular when forming the geodetic vault 16. If the fiber insert is a fabric, expandability is limited, so that reshaping into a geodetic vault may be problematical. The cloister vault 17 can be realized without any problem if respectively separate blanks are used for the four flanks of the vault, and these blanks overlap each other along the edges of the vault that separate the flanks from each other.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A crash box for a vehicle comprising a body-side end face in the form of a first wall, a bumper-side end face in the form of a second wall, and a plurality of supporting walls extending in a longitudinal direction of the crash box between, and joined with, the body-side end face and the bumper-side end face and running in different planes, wherein at least one of the body-side end face and the bumper-side end face forms a vault so that the supporting walls have lengths that vary and are shortest at a middle of the crash box, wherein the vault is configured so that loads are transferred through the first and second walls to first build in the middle of the crash box.

2. The crash box according to claim 1, wherein the vault is selected from the group consisting of a barrel vault, a geodetic vault and a cloister vault.

3. The crash box according to claim 1, wherein the vault comprises an outwardly concaved vault.

4. The crash box according to claim 1, wherein the vault forms the body-side end face.

5. The crash box according to claim 1, wherein the supporting walls border depressions that are open transverse to the longitudinal direction.

6. The crash box according to claim 5, wherein lateral walls of the depressions are comprised of supporting walls that are parallel to each other.

7. The crash box according to claim 1, wherein the supporting walls comprise a primary supporting wall and a secondary supporting walls protruding from opposing sides of the primary supporting wall.

8. The crash box according to claim 1, wherein the supporting walls are stacked one inside another.

9. The crash box according to claim 1, wherein a portion of the crash box comprises a plastic injection molded portion.

10. The crash box according to claim 9, wherein the plastic injection molded portion comprises a fiber-reinforced plastic portion.

11. A crash box for a vehicle comprising a body-side end face, a bumper-side end face and a plurality of supporting walls extending in a longitudinal direction of the crash box between the body-side end face and the bumper-side end face and running in different planes, wherein at least one of the body-side end face and the bumper-side end face forms a vault, wherein a portion of the crash box comprises a deep drawn portion formed from a fiber-reinforced semi-finished product.

12. The crash box according to claim 11, wherein the deep drawn part comprises the vault.

13. A crash box for mounting to a bumper cross member of a vehicle comprising a body-side end face, a bumper-side end face and a plurality of supporting walls extending in a longitudinal direction of the crash box between the body-side end face and the bumper-side end face and running in different planes, wherein at least one of the body-side end face and the bumper-side end face forms a vault, wherein the bumper-side end face and the bumper cross member comprise a single piece.

14. The crash box according to claim 13, further comprising a fiber insert extending from a bumper cross member into one of the supporting walls.

\* \* \* \* \*